US011213019B2

(12) United States Patent
Laughlin et al.

(10) Patent No.: US 11,213,019 B2
(45) Date of Patent: Jan. 4, 2022

(54) AQUACULTURE FISH PEN WITH MORTALITY TRAP

(71) Applicant: InnovaSea Systems, Inc., Boston, MA (US)

(72) Inventors: Joseph Leigh Laughlin, Medord, OR (US); Todd Vangsness, Stow, MA (US); Todd Matthew Shipman, Boston, MA (US); Craig Aaron McCarthy, Bridgewater, MA (US); Harrison P. Zimmer, Bainbridge Island, WA (US); Shane Taylor, Arlington, MA (US); Bradford J. Rodgers, Portsmouth, MA (US)

(73) Assignee: InnovaSea Systems, Inc., Boston, MA (US)

( * ) Notice: Subject to any disclaimer, the term of this patent is extended or adjusted under 35 U.S.C. 154(b) by 8 days.

(21) Appl. No.: 16/905,275

(22) Filed: Jun. 18, 2020

(65) Prior Publication Data
US 2020/0396966 A1 Dec. 24, 2020

Related U.S. Application Data

(60) Provisional application No. 62/862,870, filed on Jun. 18, 2019.

(51) Int. Cl.
| | |
|---|---|
| *A01K 61/60* | (2017.01) |
| *A01K 61/13* | (2017.01) |
| *A01K 63/04* | (2006.01) |

(52) U.S. Cl.
CPC .............. *A01K 61/13* (2017.01); *A01K 61/60* (2017.01); *A01K 63/042* (2013.01)

(58) Field of Classification Search
CPC ........ A01K 61/13; A01K 61/60; A01K 61/90; A01K 61/95; A01K 61/70; A01K 61/75; A22C 25/00
See application file for complete search history.

(56) References Cited

U.S. PATENT DOCUMENTS

| 85,126 A | 12/1868 | Pitt |
|---|---|---|
| 203,399 A | 5/1878 | Wyckoff |
| (Continued) | | |

FOREIGN PATENT DOCUMENTS

| CN | 108094285 A | 6/2018 |
|---|---|---|
| FR | 2 596 613 A1 | 10/1987 |
| (Continued) | | |

OTHER PUBLICATIONS

International Search Report and Written Opinion dated Sep. 7, 2020, in corresponding International Application No. PCT/US2020/038411, filed Jun. 18, 2020, 9 pages.

*Primary Examiner* — Joshua J Michener
*Assistant Examiner* — Henry Hooper Mudd
(74) *Attorney, Agent, or Firm* — Christensen O'Connor Johnson Kindness PLLC (57) ABSTRACT

A mort trap assembly includes an upper ramp with a top end, a first bottom end, and an outer edge that is fixedly attached to an inner edge of a slide. A retaining chamber is located below the upper ramp and includes a first entry port located below the first bottom end of the upper ramp. A lower ramp has a top end spaced away from the upper ramp, and a first bottom end located at a bottom of the first entry port of the retaining chamber, and a purge pipe fluidly connected to the retaining chamber. The upper ramp is configured to receive morts from the slide, and the lower ramp is configured to receive the morts from the upper ramp and to direct the received morts into the first entry port.

20 Claims, 6 Drawing Sheets

(56) References Cited

U.S. PATENT DOCUMENTS

| | | | |
|---|---|---|---|
| 215,031 | A | 5/1879 | Webb |
| 1,485,875 | A | 3/1924 | O'Malley |
| 1,614,600 | A | 1/1927 | Cleaver |
| 2,606,350 | A | 8/1952 | French |
| 3,691,994 | A | 9/1972 | McPherson |
| 3,702,709 | A | 11/1972 | Shaffer |
| 3,992,737 | A | 11/1976 | Duel |
| 4,147,130 | A | 4/1979 | Goguel |
| 4,252,081 | A | 2/1981 | Smith |
| 4,312,296 | A | 1/1982 | Stelleman |
| 4,337,553 | A | 7/1982 | Fischer |
| 4,380,213 | A | 4/1983 | Blair |
| 4,615,301 | A | 10/1986 | Maekawa |
| 4,747,369 | A | 5/1988 | Götmalm |
| 5,172,649 | A | 12/1992 | Bourgeois |
| 5,193,481 | A | 3/1993 | Loverich |
| 5,359,962 | A | 11/1994 | Loverich |
| 5,517,936 | A | 5/1996 | Mennucci et al. |
| 5,617,813 | A | 4/1997 | Loverich et al. |
| 5,636,595 | A | 6/1997 | Lunde et al. |
| 6,044,798 | A | 4/2000 | Foster |
| 6,117,313 | A | 9/2000 | Goldman et al. |
| 6,892,672 | B2 | 5/2005 | Klein |
| 6,932,025 | B2 | 8/2005 | Massingill et al. |
| 7,284,501 | B2 | 10/2007 | Page |
| 7,650,856 | B2 | 1/2010 | Cortiñas |
| 7,681,528 | B2 | 3/2010 | Ytterland |
| 8,028,660 | B2 | 10/2011 | Troy |
| 8,683,955 | B2 | 4/2014 | Madsen et al. |
| 9,072,282 | B2 | 7/2015 | Madsen et al. |
| 10,231,443 | B2 | 3/2019 | Gace |
| 2006/0096548 | A1 | 5/2006 | Ytterland |
| 2006/0102087 | A1 | 5/2006 | Page |
| 2006/0162667 | A1 | 7/2006 | Papadoyianis et al. |
| 2007/0169711 | A1 | 7/2007 | Sims |
| 2008/0110408 | A1 | 5/2008 | Thorvardson |
| 2012/0167829 | A1 | 7/2012 | Madsen et al. |
| 2015/0359206 | A1 | 12/2015 | Naess |

FOREIGN PATENT DOCUMENTS

| | | |
|---|---|---|
| JP | 62-172358 U | 10/1987 |
| NO | 160753 B | 2/1989 |
| WO | 87/03170 A1 | 6/1987 |
| WO | 2010082834 A1 | 7/2010 |
| WO | 2011133045 A1 | 10/2011 |
| WO | 2017147281 A1 | 8/2017 |
| WO | 2018111111 A1 | 6/2018 |

AQUACULTURE FISH PEN WITH MORTALITY TRAP

CROSS-REFERENCE TO RELATED APPLICATION

This application claims the benefit of Provisional Application No. 62/862,870, filed Jun. 18, 2019. The entire disclosure of said application is hereby incorporated by reference herein.

BACKGROUND

For millennia, the seas and natural water reservoirs have provided an abundant and stable source of food for humankind. In recent years, however, overfishing, inefficient harvesting practices, and environmental stressors have resulted in the depletion or decline of certain fish populations in many regions. At the same time, an increasing human population, increasing standards of living, and an increasing awareness of the health benefits of seafood have increased the demand for fish and fish product.

Advances in aquaculture in general and fish farming in particular, and improvements in technology, have enabled significant progress to be made to efficiently address increasing world demand for fish product at lower costs. Developments in fish farming reduced the risks associated with overfishing indigenous fish populations. In particular, open-ocean aquaculture employing fish cages or fish pens, have found some recent success. Large fish pens suitable for aquaculture applications are known in the art aid for the efficient and bio-responsible cultivation of food sources. Typically, in open-ocean aquaculture large fish pens are positioned a distance offshore in deeper and less-sheltered waters where ocean currents are relatively strong. The fish pens are stocked with young fish or fry, and the fish are fed and maintained until they reach maturity. The fish pens provide a habitat and protection for the fish. Similar fish pens are also used for freshwater aquaculture, for example, in larger freshwater bodies of water.

A common problem in conventional commercial aquaculture fish pens is the safe identification and removal of ill and deceased fish within the system. When fish in a commercial fish pen die or become debilitatingly ill, the deceased or ill fish (referred to in the art as "morts") will initially have a negative buoyancy and sink to a bottom end of the fish pen. However, after a time the morts may become neutrally buoyant and then positively buoyant due to gasses generated therein. If morts are not regularly removed they may become very difficult to identify, isolate, and separate from the healthy fish population. Mort collection in an open ocean fish pen is a significant and time-consuming task requiring the regular (e.g., daily) deployment of divers tasked with removing morts. Typically, safety protocols require raising the fish pen to a maximum elevation to minimize the maximum diving depth required for the divers. Manual removal of morts in conventional fish pens requires divers to enter the fish pen, identify and collect morts in mesh bags, and then either swim the filled mesh bag back to a retrieval vessel, or attach the bag to a safety line to be hauled to the retrieval vessel. Risks to the divers include the possibility of underwater predators being drawn to the area by the morts.

There are clear benefits to quickly identifying, isolating, and removing morts. By identifying and retrieving morts the cause of death can be timely determined, and appropriate corrective measures implemented to prevent or reduce the loss of additional fish. For example, if a mort is found to be inflicted with a pathogen for which a protective treatment is available, early administration of the treatment can be implemented. If the cause of death is determined to be related to food or other product provided to the pen, then corrective measures may be timely implemented. In addition, removing the morts reduces the time that the mort is among the healthy fish population, thereby slowing or preventing the spread of pathogen(s) in the population. Even if a natural, non-pathogenic cause of death is responsible, it would be advantageous to remove morts from the population for general health maintenance of the fish pen and to avoid undesirably attracting predators to the area of the fish pen.

Innovations in fish pens employing a center spar buoy or center cluster of spar buoys are disclosed in U.S. Pat. No. 5,359,962, to Loverich, and in U.S. Pat. No. 5,617,813, to Loverich et al., both of which are hereby incorporated by reference in their entireties. Loverich et al. discloses a mobile pen for growing fish or shellfish wherein a central vertical spar buoy is surrounded by one or more horizontal rim assemblies. A mesh/netting extends from an upper end portion of the spar buoy outward to the rim assemblies, and then inward from the rim assembly to a lower end portion of the spar buoy, defining the primary interior volume 105 for the fish. More recently, U.S. Pat. No. 9,072,282, to Madsen et al., which is also hereby incorporated by reference, discloses a spar buoy fish pen assembly with a deployable system for segregating a population of fish within a fish pen, and/or for crowding the fish into a smaller space, for example, to facilitate treatment or harvesting operations.

Figure 1:
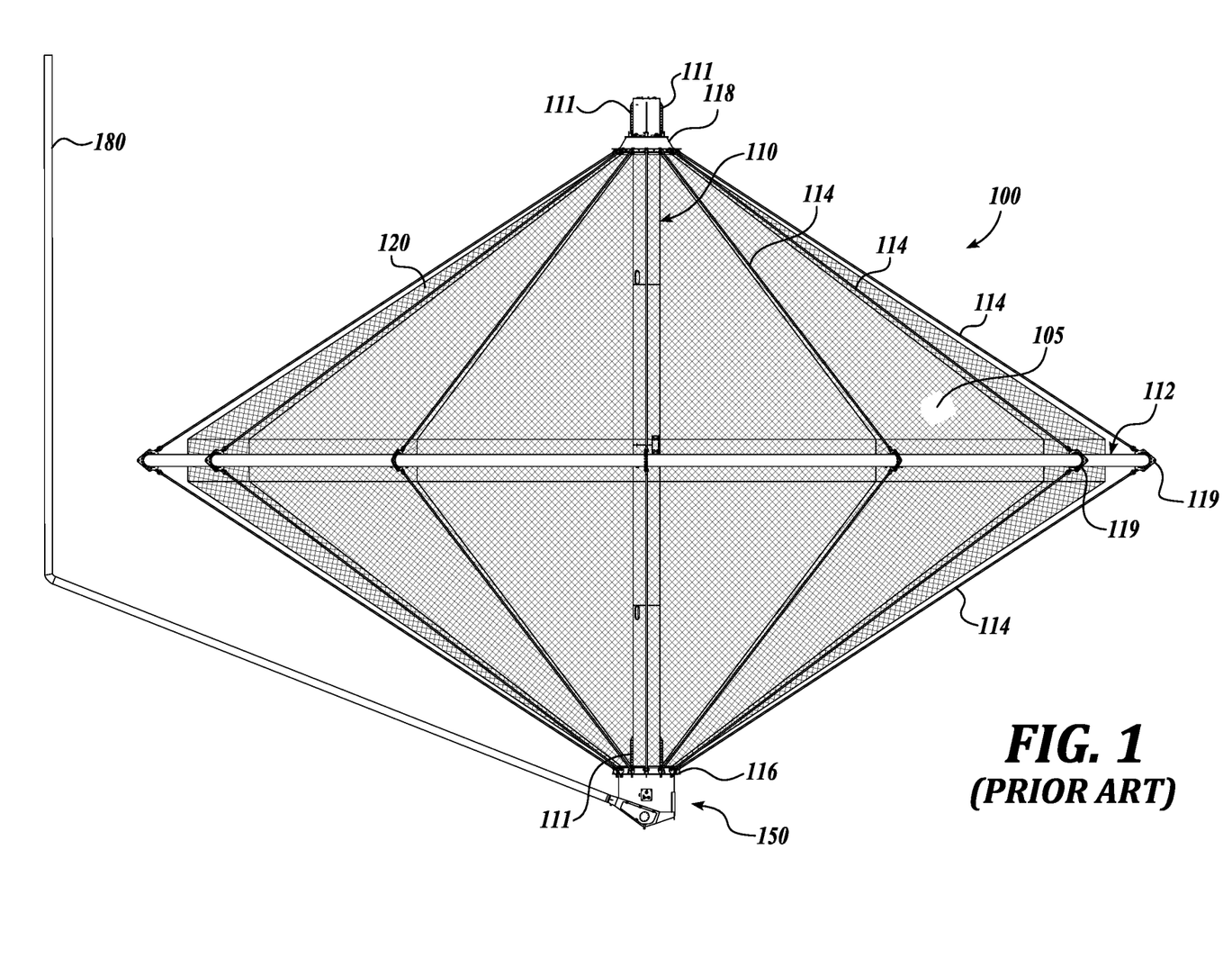
FIG. 1 shows a prior art vertical spar fish pen with a mort trap.

FIG. 1 shows a front view of a vertical spar fish pen 100 disclosed in U.S. Pat. No. 10,231,443, to Gace et al., which is hereby incorporated by reference. Gace et al. discloses a fish pen having a central spar buoy 110 supporting an enclosure defined by a netting assembly 120, and suitable for use in open-ocean fish farming, for example. A mortality trap ("mort trap") 150 is attached to a lower end of the spar buoy 110. The mort trap 150 is configured to receive and isolate morts from the remaining fish population in the fish pen 100. An external extraction hose 180 extends from the mort trap 150 external to the fish pen 100, to facilitate removal of morts from the mort trap 150. The mort trap 150 may also be configured to facilitate the harvesting or extraction of healthy live fish from the fish pen 100.

In an exemplary embodiment the spar buoy 110 includes one or more interior spaces (not shown) that can be selectively filled with water or with air (or another gas). It will typically be desirable to raise the fish pen 100 at least partially out of the water, for example to facilitate fish pen cleaning, inspection, maintenance, upgrade, and/or repair. In a current embodiment, the fish pen 100 is configured with, or configured to engage, an air pumping assembly (not shown) such that air may be pumped into chambers in the spar buoy 110, displacing sea water and thereby increasing the buoyancy of the spar buoy 110. The spar buoy 110 may therefore raise the fish pen 100 partially out of the water. The spar buoy 110 may be connected to an anchor or ballast member (not shown) to maintain the vertical orientation of the spar buoy 110. In some embodiments the spar buoy 110 may be configured to allow the user to flip the fish pen 100 to selectively raise either end of the fish pen 100 out of the water. It will also be appreciated by persons of skill in the art that raising the fish pen 100 may also be beneficial when harvesting fish from the fish pen 100, for example, to crowd the fish into a smaller volume within the fish pen 100.

A rim assembly 112 is disposed around the spar buoy 110. The rim assembly 112 in the exemplary embodiment is formed from a plurality of tubular segments assembled into a polygonal or circular configuration. The rim assembly 112 in the embodiment of FIG. 1 is disposed generally perpendicular to the spar buoy 110. In some embodiments the buoyancy of the rim assembly 112 is adjustable. For example, the rim assembly 112 in cooperation with the spar buoy 110 may be configured to be filled with air, water, or a combination of air and water, to produce a desired fish pen 100 buoyancy, or to reorient or invert the fish pen 100, e.g., by asymmetrically changing the buoyancy of the rim assembly 112.

The rim assembly 112 is attached to the spar buoy 110 with a plurality of tension members 114 that extend between a lower spokeline ring 116 and the rim assembly 112, and a plurality of tension members that extend between an upper spokeline ring or cone 118 and the rim assembly 112. The rim assembly 112 includes a plurality of spaced-apart guides, pulleys, or flanges 119 that are configured to engage respective tension members 114. The flanges 119 provide attachment or engagement points for the tension members 114, and may also be used to anchor the fish pen 100, and/or to gang or interconnect a plurality of fish pens 100. In some embodiments, the fish pen 100 may comprise more than one rim assembly 112. For example, the fish pen may have two or more parallel and spaced-apart rim assemblies 112.

The cone 118 is connected near an upper end of the spar buoy 110. In the current embodiment, the cone 118 is attached to the spar buoy 110 through a plurality of longitudinal rails 111 fixed to, or co-formed with, an outer surface of the spar buoy 110. The rails 111 preferably include a plurality of spaced attachment positions such that the axial location of the cone 118 is adjustable.

There remains a need for improvements in fish pen construction. For example, in contained fish pen populations it is desirable to remove or separate sick or deceased fish from the healthy population quickly, in order to prevent harm to the healthy fish. It would be beneficial to isolate morts quickly, to maintain the health of the remaining population. It would also be beneficial to identify and remove morts quickly, to be able to determine the cause of death and, if appropriate, take corrective measures.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A mort trap assembly for a fish pen may include a slide configured to receive descending morts in the fish pen and direct the morts into a mort trap. The slide has an outer edge that engages the fish pen and an inner edge that is attached to an outer edge of an upper ramp of the mort trap. Alternatively, the mort trap may be configured to engage the outer netting of the fish pen assembly directly, wherein the outer netting of the fish pen assembly directs morts into the mort trap. The upper ramp has a top end and a first bottom end. A retaining chamber is located below the upper ramp and includes an entry port that is located below the bottom end of the upper ramp. The mort trap includes a lower ramp having a top end spaced away from the upper ramp, and a bottom end located at a bottom of the first entry port of the retaining chamber. A purge pipe, for example a riser, is fluidly connected to the retaining chamber. The upper ramp is configured to receive morts from the slide, and the lower ramp is configured to receive the morts from the upper ramp and to direct the received morts into the first entry port. The upper and lower ramps will also receive descending morts that do not engage the upper ramp.

In an embodiment the upper ramp includes an inner edge that curves upwardly, to guide morts descending along the upper ramp.

In an embodiment the slide is formed from a composite material, for example a fiberglass composite or the like.

In an embodiment the mort trap assembly includes pliable live fish excluder overlying the first entry port.

In an embodiment the riser includes an air injection system configured to controllably inject air into the riser.

In an embodiment the retaining chamber includes a second entry port.

In an embodiment the riser extends to a top end portion of the fish pen.

In an embodiment the mort trap assembly defines a central aperture configured to receive an end of a spar buoy of the fish pen.

A mort trap for a fish pen includes semi- or partially-annular retaining chamber having a first entry port and a second entry port opposite to the first entry port, with an upper ramp disposed above the retaining chamber and having a first ramp portion that slopes downwardly to a top of the first entry port, and a second ramp portion that slopes downwardly to a top of the second entry port. A first lower ramp has an upper end and slopes downwardly to a bottom of the first entry port, and a second lower ramp has an upper end and sloping downwardly to a bottom end of the second entry port. A purge pipe, for example a riser, is fluidly connected to the retaining chamber between the first entry port and the second entry port.

In an embodiment the mort trap includes an upper ramp with an inner edge that curves upwardly.

In an embodiment a pliable live fish excluder, for example a curtain is disposed over the first entry port and configured to permit morts to pass from the first lower ramp into the retaining chamber.

In an embodiment the riser includes an air injection system configured to controllably inject air into the riser.

In an embodiment the riser extends to a top end portion of the fish pen.

In an embodiment the mort trap assembly defines a central aperture configured to receive an end of a spar buoy of the fish pen.

In an embodiment the slide comprises a composite material, in other embodiments the slide comprises a metal, for example steel or aluminum.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

As used herein, "morts" is defined to mean deceased or ill fish, and in particular deceased or ill fish in a fish pen assembly, and a "ramp" is defined to mean a component providing an elongate surface that slopes, i.e., a surface that slopes downwardly.

Figure 2:
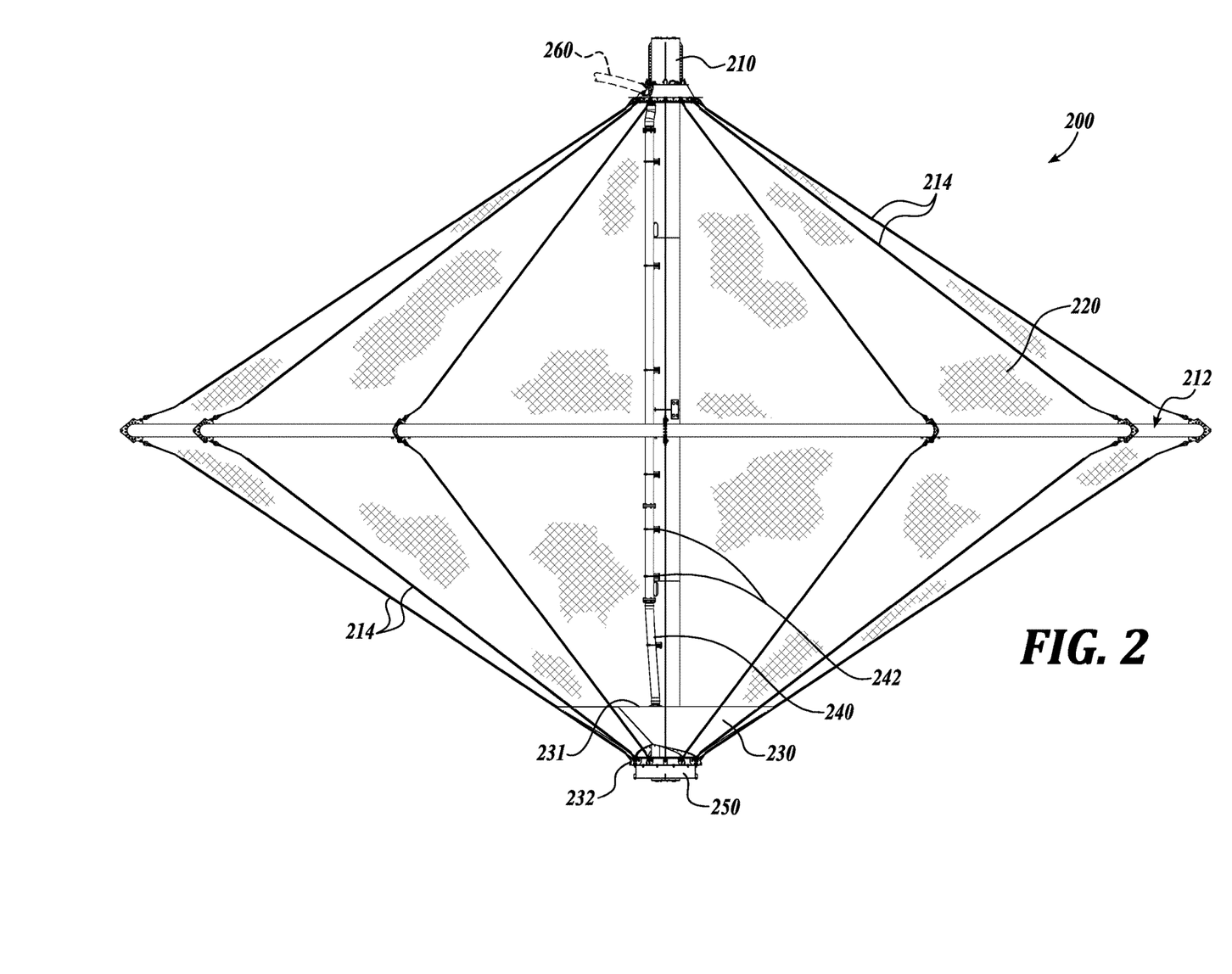
FIG. 2 is a front view of a vertical spar fish pen with a mort trap in accordance with the present invention.

FIG. 2 is a front view of a fish pen assembly 200 in accordance with the present invention, including a mort trap 250 that may be installed, for example, at or near a lower end of the fish pen assembly. The fish pen assembly 200 includes a vertical spar buoy 210 and a rim assembly 212 that extends around the spar buoy 210. In a currently preferred embodiment the mort trap 250 may be positioned at any location along the full height of the spar buoy 210, for example to receive morts when an intermediate nursery net or the like (not shown) is installed/deployed in the fish pen 200 to reduce the occupied volume of the fish pen 200. The rim assembly 212 is attached to the spar buoy 210 with a first plurality of tension members 214, for example cables, that connect the rim assembly 212 to an upper end portion of the spar buoy 210, and a second plurality of tension members 214 that connect the rim assembly to a lower end portion of the spar buoy 210. A netting assembly 220 is connected to the spar buoy 210 and the rim assembly 212 to define a working volume for the fish enclosure. In some embodiments the fish pen assembly 200 includes a system, for example a pumping system (not shown) for changing the buoyancy of the spar buoy 210 and/or the rim assembly 212 to controllably change the buoyancy of the fish pen assembly 200, such that the fish pen assembly 200 can be moved between a submerged position wherein the fish pen assembly 200 is submerged below the water surface, and a raised position wherein a significant portion of the fish pen assembly 200 is disposed above the water surface. In some installations one or more anchor assemblies (not shown) are provided to secure the fish pen assembly 200 in a desired location. In some installations a plurality of fish pen assemblies 200 may be interconnected or otherwise maintained in close proximity to each other, and may share a centralized operating infrastructure, for example, feeding, monitoring and/or control systems.

The fish pen assembly 200, in this embodiment, includes a mort slide 230, e.g., a false bottom, installed inside a lower portion of the fish pen 200. In the current embodiment the mort slide 230 extends only partially around the spar buoy 210, for example, about half way around the spar buoy 210, as seen most clearly in FIG. 3. In some embodiments a slide may be configured to extend fully around the spar buoy 210. The false bottom mort slide 230 has an upper end 231 fixed to or otherwise abutting, the netting assembly 220 and an opposite end 232 that engages an upper ramp 252 of the mort trap 250, as discussed below. The mort slide 230 is configured to guide morts that engage the slide 230 as they descend through the fish pen 200 such that the engaged morts are captured in the mort trap 250, preventing these morts from sinking into a region adjacent to the mort trap 250. For example, the mort slide 230 in a current embodiment is made from an ultra-high-molecular-weight polyethylene (UHMWPE). UHMWPE has mechanical characteristics similar to high-density polyethylene (HDPE), and is resistant to acids, alkalis, and many organic solvents. It has a very low coefficient of friction and is self-lubricating. Suitable UHMWPE fibers include fibers marketed under the trademark DYNEEMA®, registered to DSM High Performance Fibers B.V. Corporation, Netherlands. The false bottom mort slide 230 may be a netting made from a fiber-reinforced composite material, such as fiberglass, having a relatively low sliding friction coefficient to facilitate the morts sliding into the mort trap 250. Optionally, the slide 230 may include a water-insoluble lubricant on its surface to facilitate the engaged morts to continue their descent to the mort trap 250.

Figure 3:
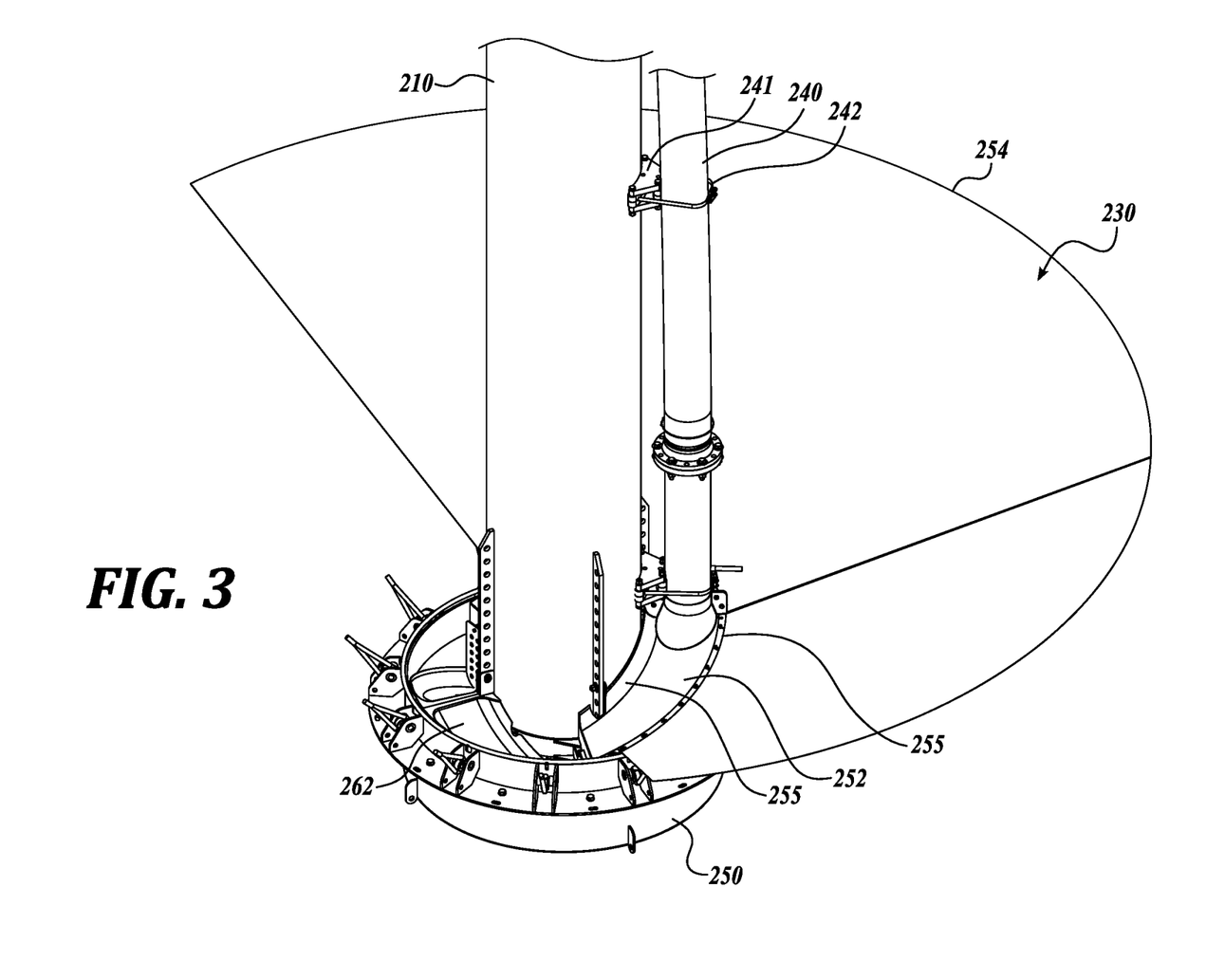
FIG. 3 is a detail view showing the mort trap, slide, and portions of the spar buoy and purge pipe, in this embodiment a riser, of the fish pen shown in FIG. 2.

A purge pipe, for example a riser 240 extends from the mort trap 250, and in the present embodiment is attached to the spar buoy 210 with one or more fastening clamps 242 with spacer members 241 (see also, FIG. 3). As discussed below (e.g., see FIG. 5) a pumping system may be provided to transport morts from the mort trap 250 to a location at or near the top of the fish pen assembly 200, thereby eliminating the need for divers to conduct regular manual recovery of the morts.

Figure 4A:
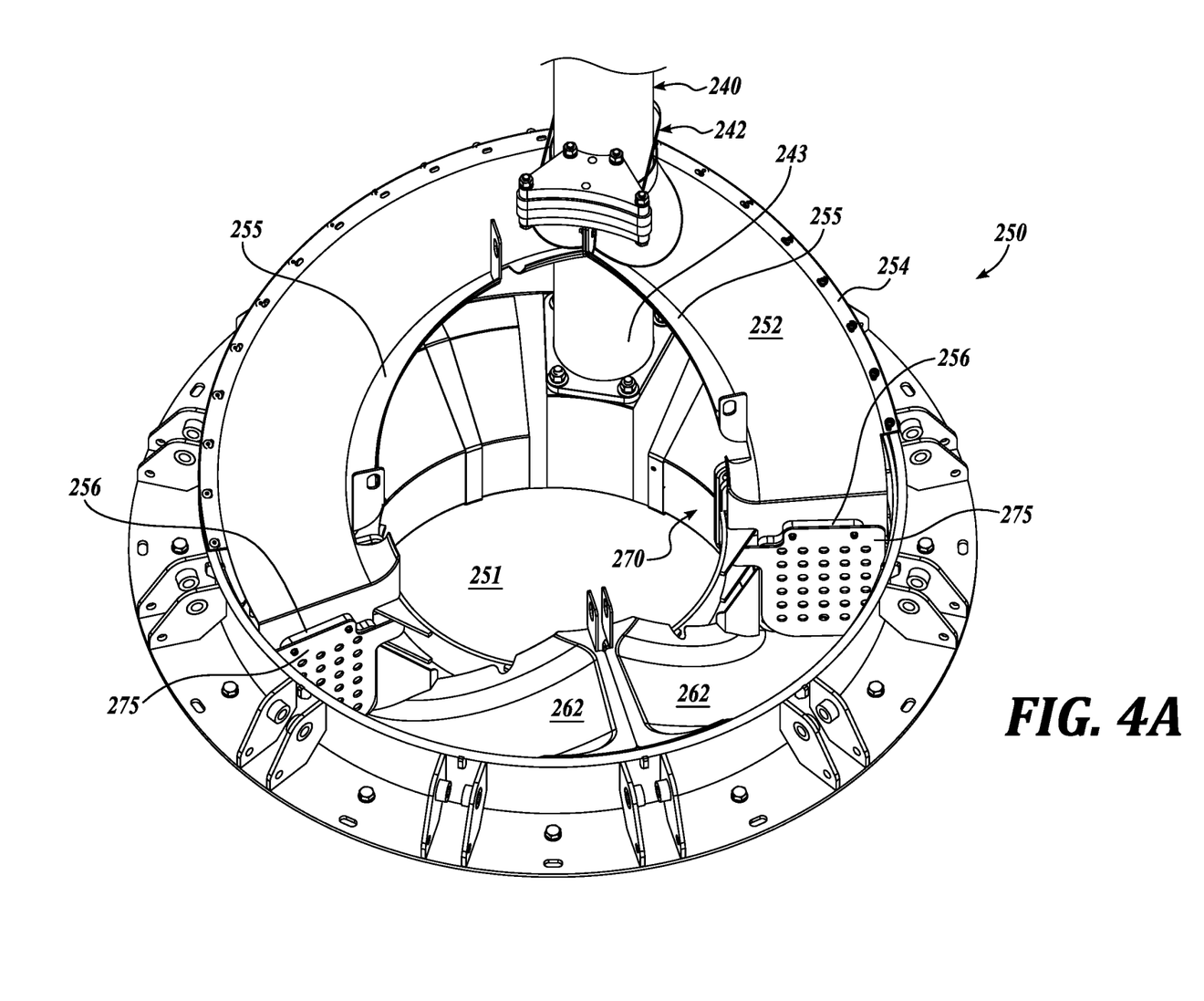
FIG. 4A is a detail view showing the mort trap connected to the riser of the fish pen shown in FIG. 2.
Figure 4B:
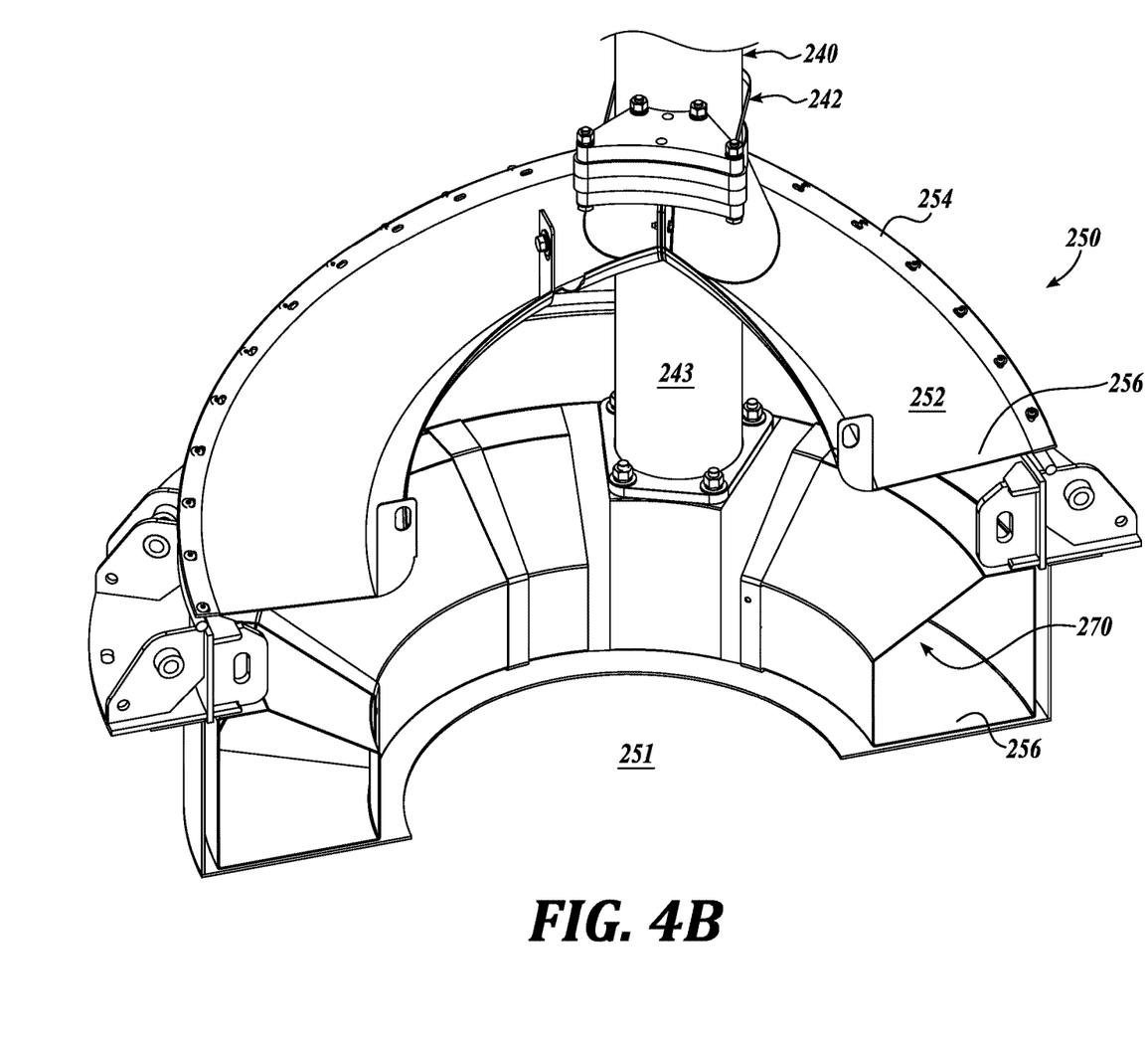
FIG. 4B is a section view of the mort trap shown in FIG. 4A.

FIG. 3 shows a detail view of the mort trap 250 connected to a bottom portion of the spar buoy 210 and the slide member 230. In this embodiment the slide 230 is fixedly attached to an upper ramp 252 of the mort trap 250 located on one side. Refer also to FIG. 4A showing a perspective view of the mort trap 250 (connected to the riser 240), and to FIG. 4B showing a sectional view of the mort trap 250.

The mort trap 250 is generally annular with a central aperture 251 that is sized and configured to receive a lower end portion of the spar buoy 210. Other configurations are contemplated, as will be apparent to persons of ordinary skill in the art. For example, the mort trap may alternatively be configured to attach to, and extend below, a lower end of the spar buoy 210, or to be formed integrally with the spar buoy. In a currently preferred embodiment the annular mort trap 250 is configured to be installed at one or more intermediate locations along the spar buoy 210. For example, the annular mort trap 250 may be installed at a location above the midpoint along the length of the spar buoy 210 for use with an intermediate nursery nets and harvest systems (not shown) that may be installed to reduce the occupied volume of the fish pen 200.

The mort trap 250 includes the upper ramp 252 having a radially outer edge that is fixed to a lower end of the slide 230 such that morts descending along the slide 230 are directed by the slide 230 onto the upper ramp 252. An inner edge 255 of the upper ramp 252 curves upwardly to engage and guide received morts as they slide down the upper ramp 252. The upper ramp 252 includes left and right ramp sections that slope downwardly from a central portion located near the riser 240 towards a corresponding one of two spaced-apart entry ports 256 to a retaining chamber 270 located below the upper ramp 252. The upper ramp 252 is configured to receive morts, directly or from the slide portion 230, and to guide their continued descent toward the entry ports 256. In this embodiment the retaining chamber 270 is generally semi- or partially annular, or horseshoe-shaped chamber with space-apart openings at each end. A pair of lower ramps 262 are positioned opposite the upper ramp 252 and are configured to receive descending morts from the upper ramps 252 and to receive morts descending from elsewhere in the fish pen 200. The lower ramps 262 slope downwardly in opposite directions towards a corresponding one of the entry ports 256 to the retaining chamber 270. The retaining chamber 270 is therefore configured to receive morts from the lower ramps 262.

Pliable curtains or live fish excluders 275 on either side of the retaining chamber 270 are configured to permit descending morts to enter the retaining chamber 270, and provide a visual deterrent to discourage live fish from entering the retaining chamber. For example, in a current embodiment the live fish excluder 275 comprises an upper frame, door flap with weights at the bottom of the door. The door flap (either solid or in strips) may be, for example, 0.0625-0.500 inches or more in thickness. A plurality of holes may be placed at intervals along a lower edge of the door and weighted blocks may be selectively installed. These tunable aspects of the assembly allows for specific movement of the door to both allow morts to enter the containment area, throughout a multitude of environmental conditions (e.g., water current, pen position in the water column, etc.), while visually and physically inhibiting living or well fish from entering the retaining chamber 270. The live fish excluders 275 preferably are configured to allow live fish that are able to breach the excluder to exit the retaining chamber 270. It is contemplated that in some embodiments the retaining chamber may have a vertical dimension greater than the vertical dimension of the entry ports 256 and/or a transverse dimension greater than the transverse dimension of the entry ports 256, thereby providing a retaining chamber with a large volume relative to the size of the entry ports 256.

As seen most clearly in FIG. 4B, the riser 240 includes an end connector portion 243 that fluidly connects the riser 240 to the retaining chamber 270, such that morts in the retaining chamber 270 can pass into the riser 240.

Figure 5:
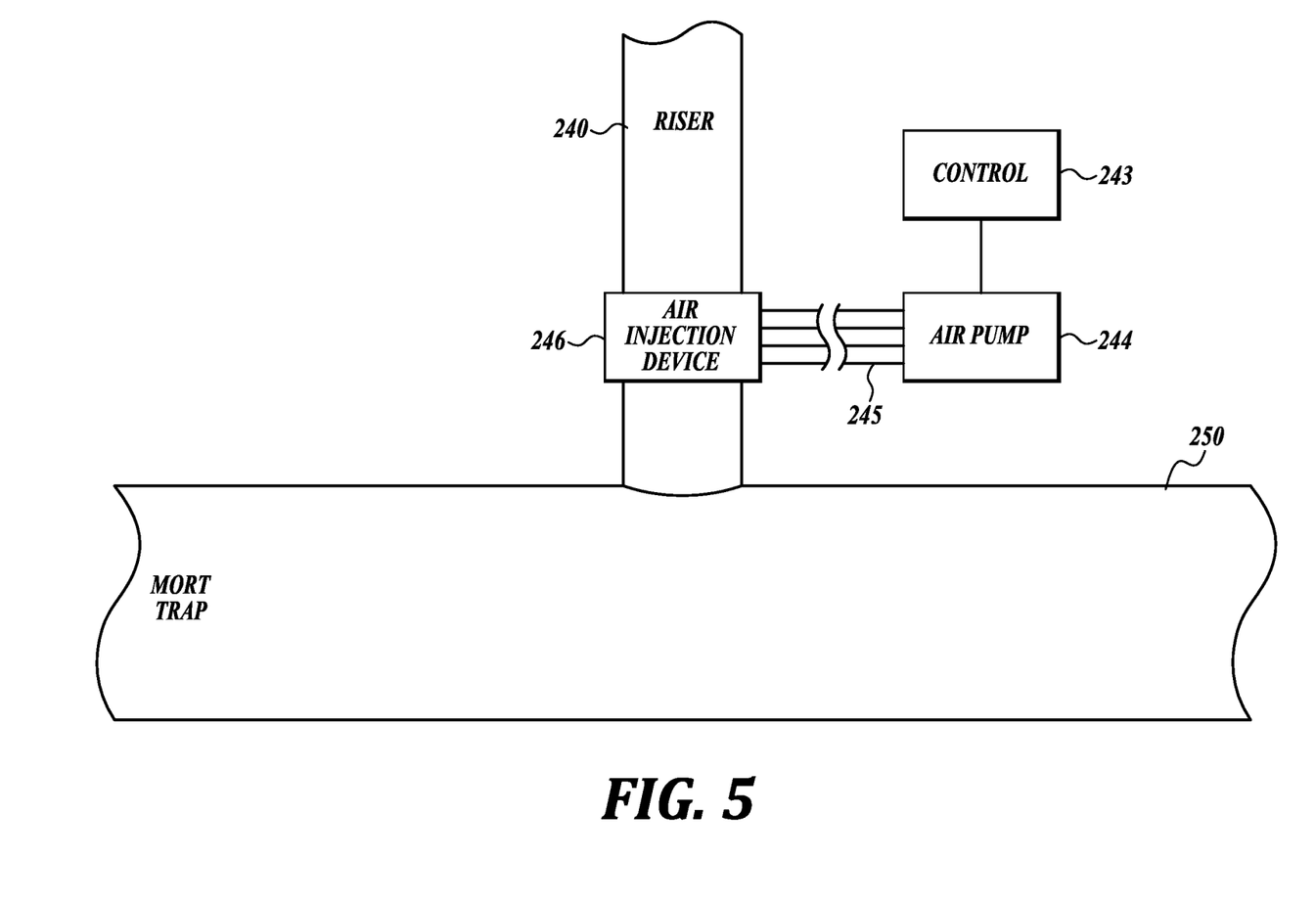
FIG. 5 illustrates an air purge system in accordance with the present invention.

Referring now also to FIG. 5, illustrating in diagram one embodiment of a mort transport system using an air pump 244 configured to facilitate the transport of morts from the mort trap 250 upwardly through the riser 240 to a discharge hose 260 located at or near an upper end of the fish pen assembly 200. The transport system facilitates removal of the morts from the mort trap 250.

In this embodiment an air pump 244 is configured to inject air into the riser 240 periodically or on command. It is contemplated that the mort trap 250 may be purged without raising the fish pen assembly 200 to the surface, for example, providing a discharge hose 260 that extends from the fish pen assembly 200 to a remote collection location. For example, in one embodiment an elongate discharge hose 260 may extend through one or more intermediate node buoys (not shown) to an arterial collection station located away from the fish pen 200. For example, a plurality of fish pens 200 may discharge morts to a single collection station. In other embodiments, the fish pen 200 may be raised to the surface prior to discharging morts.

In this embodiment air is injected into the riser 240 near a lower end of the riser 240, to produce a buoyancy-driven upward flow through the riser 240. The buoyancy-driven upward flow draws water and morts from the mort trap 250 and transports the morts to the discharge hose 260 (see FIG. 2).

In another embodiment a water pump is connected to the riser 240 and configured to selectively generate a flow through the riser 240 towards the discharge hose 260.

It will be obvious to persons of ordinary skill in the art that not all descending morts in the fish pen assembly 200 will engage the mort slide 230, and that not all morts will engage the upper slide 252. For example, some morts may engage the upper ramp 152 directly, without contacting the slide 230, and other morts may engage the lower ramp 262 directly, without engaging either the slide 230 or the upper ramp 152. Typically all or substantially all morts will engage the lower slide 262, and will be directed into the retaining chamber 270 by the lower slide 262.

While illustrative embodiments have been illustrated and described, it will be appreciated that various changes can be made therein without departing from the spirit and scope of the invention.

The embodiments of the invention in which an exclusive property or privilege is claimed are defined as follows:

1. A mort trap assembly for a fish pen comprising:
   a slide configured to receive descending morts in the fish pen, the slide having an outer edge configured to engage the fish pen and an inner edge; and
   a mort trap comprising:
      an upper ramp comprising a first ramp portion having a top end and a bottom end, the first ramp portion having an outer edge that is fixedly attached to the inner edge of the slide;
      a retaining chamber located below the upper ramp, the retaining chamber having a first entry port located below the bottom end of the first ramp portion;
      a lower ramp having a top end spaced away from the upper ramp, and a bottom end located at a bottom of the first entry port; and
      a purge pipe fluidly connected to the retaining chamber, wherein the upper ramp is configured to receive morts from the slide, and the lower ramp is configured to receive the morts from the upper ramp and to direct the received morts towards the first entry port.

2. The mort trap assembly of claim 1, wherein the upper ramp comprises an inner edge that curves upwardly.

3. The mort trap assembly of claim 1, wherein the slide comprises a composite material.

4. The mort trap assembly of claim 1, wherein the slide comprises an ultra-high-molecular-weight polyethylene netting.

5. The mort trap assembly of claim 1, further comprising a live fish excluder extending across the first entry port.

6. The mort trap assembly of claim 5, wherein the live fish excluder comprises a flexible curtain.

7. The mort trap assembly of claim 1, wherein the purge pipe comprises a riser that is configured to extend vertically into the fish pen.

8. The mort trap assembly of claim 7, further comprising an air injection system configured to controllably inject air into the riser.

9. The mort trap of claim 7, wherein the riser extends to a top end portion of the fish pen.

10. The mort trap assembly of claim 1, wherein the upper ramp further comprises a second ramp portion extending away from the first ramp portion and having an outer edge that is attached to the inner edge of the slide, the mort trap further comprising a second lower ramp, wherein the retaining chamber further comprises a second entry port located between a distal end of the second ramp portion and a distal end of the second lower ramp.

11. The mort trap assembly of claim 1, wherein the mort trap assembly defines a central aperture configured to receive an end of a spar buoy of the fish pen therethrough.

12. A mort trap for a fish pen comprising:
    a semi- or partially-annular retaining chamber having a first entry port and a second entry port spaced apart from the first entry port;
    an upper ramp disposed above the retaining chamber and having a first ramp portion that slopes downwardly to a top of the first entry port, and a second ramp portion that slopes downwardly to a top of the second entry port;

a first lower ramp having an upper end and a lower end, the first lower ramp sloping downwardly to a bottom of the first entry port;
   a second lower ramp having an upper end and a lower end, the second lower ramp sloping downwardly to a bottom end of the second entry port; and
   a purge pipe fluidly connected to the retaining chamber between the first entry port and the second entry port.

13. The mort trap of claim 12, wherein the upper ramp comprises an inner edge that curves upwardly.

14. The mort trap of claim 12, further comprising a live fish excluder disposed over the first entry port and configured to permit morts to pass from the first lower ramp into the retaining chamber.

15. The mort trap of claim 12, wherein the purge pipe comprises a riser configured vertically into the fish pen.

16. The mort trap of claim 15, wherein the riser includes an air injection system configured to controllably inject air into the riser.

17. The mort trap of claim 15, wherein the purge pipe extends to a top end of the fish pen.

18. The mort trap of claim 12, wherein the mort trap assembly defines a central aperture configured to receive an end of a spar buoy of the fish pen.

19. The mort trap of claim 12, further comprising a slide member having an inner edge that if fixed to the upper ramp and an outer edge configured to attach to the fish pen.

20. The mort trap of claim 12, wherein the slide member comprising an ultra-high-molecular-weight polyethylene netting.

* * * * *